MULTIPLEX TRANSMISSION OF TELEVISION SIGNALS

Filed Nov. 12, 1947 2 Sheets-Sheet 1

Inventor:
Harold John Schrader
By J. L. Whittaker
Attorney

Oct. 31, 1950 H. J. SCHRADER 2,527,967

MULTIPLEX TRANSMISSION OF TELEVISION SIGNALS

Filed Nov. 12, 1947 2 Sheets-Sheet 2

Inventor:
Harold John Schrader

By J. L. Whittaker
Attorney

Patented Oct. 31, 1950 2,527,967

UNITED STATES PATENT OFFICE 2,527,967

MULTIPLEX TRANSMISSION OF TELEVISION SIGNALS

Harold J. Schrader, Haddonfield, N. J., assignor to Radio Corporation of America, a corporation of Delaware Application November 12, 1947, Serial No. 785,335

4 Claims. (Cl. 178—6)

This invention relates to multiplex transmission of television signals by time sharing of a single channel such as a high frequency carrier. One application for multiplex television is in aircraft navigation systems of the type described in U. S. patent application Serial Number 607,999½ filed July 31, 1945, by Loren F. Jones and entitled Radio Navigation System, wherein a ground based radar scans a surrounding service area to produce a visual display showing the positions of aircraft in said area, and the display is relayed by television to the aircraft concerned. At the ground station the various radar signals are separated according to the altitudes of the respective aircraft which they represent, the position of each craft being shown on one of a plurality of PPI (Plan Position Indication). Each indicator shows only the positions of all craft within a respective altitude layer.

The ground station broadcasts television signals representing all of the PPI displays, and on each aircraft the television signals corresponding to its altitude layer are selected and displayed. Since the spots or "pips" in the PPI display move very slowly, considerable economy in the utilization of the available radio frequency spectrum can be effected by time division multiplexing of the several television pictures, those representing the different altitude layers being transmitted in sequence, one field at a time. Assuming N different pictures to be transmitted, the airborne television equipment may select and display every Nth field.

The principal object of the present invention is to provide improved methods and means for controlling a bank of television cameras to enable them sequentially to produce one field or frame, in regular predetermined order at the same time identifying the current frame or field.

Another object is to provide code signals which cooperate with the vertical synchronizing pulses of the television signal to identify the frame or field being transmitted at the moment.

Figure 1:
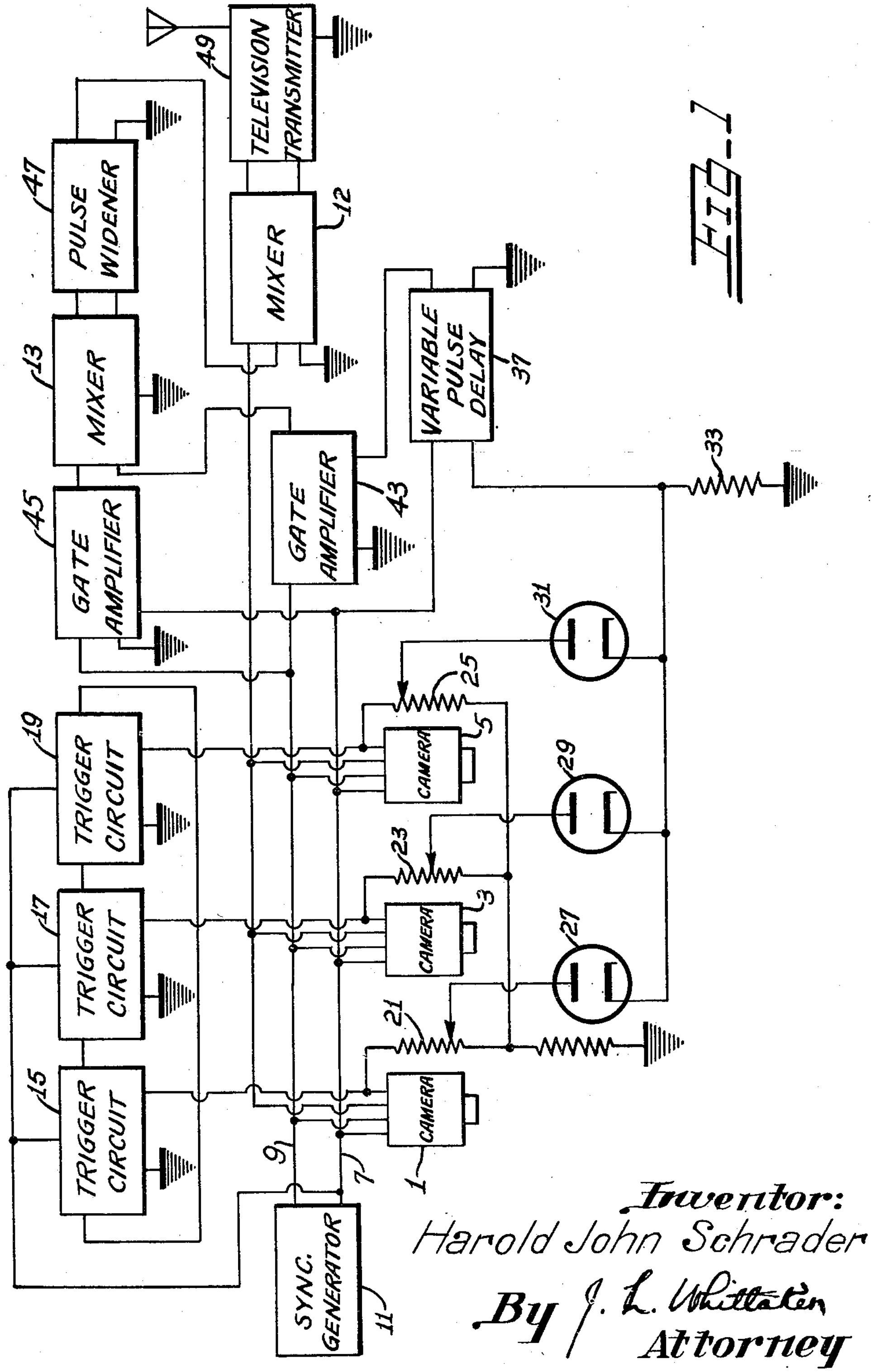
Figures 2, 3, 4, 5, 6:
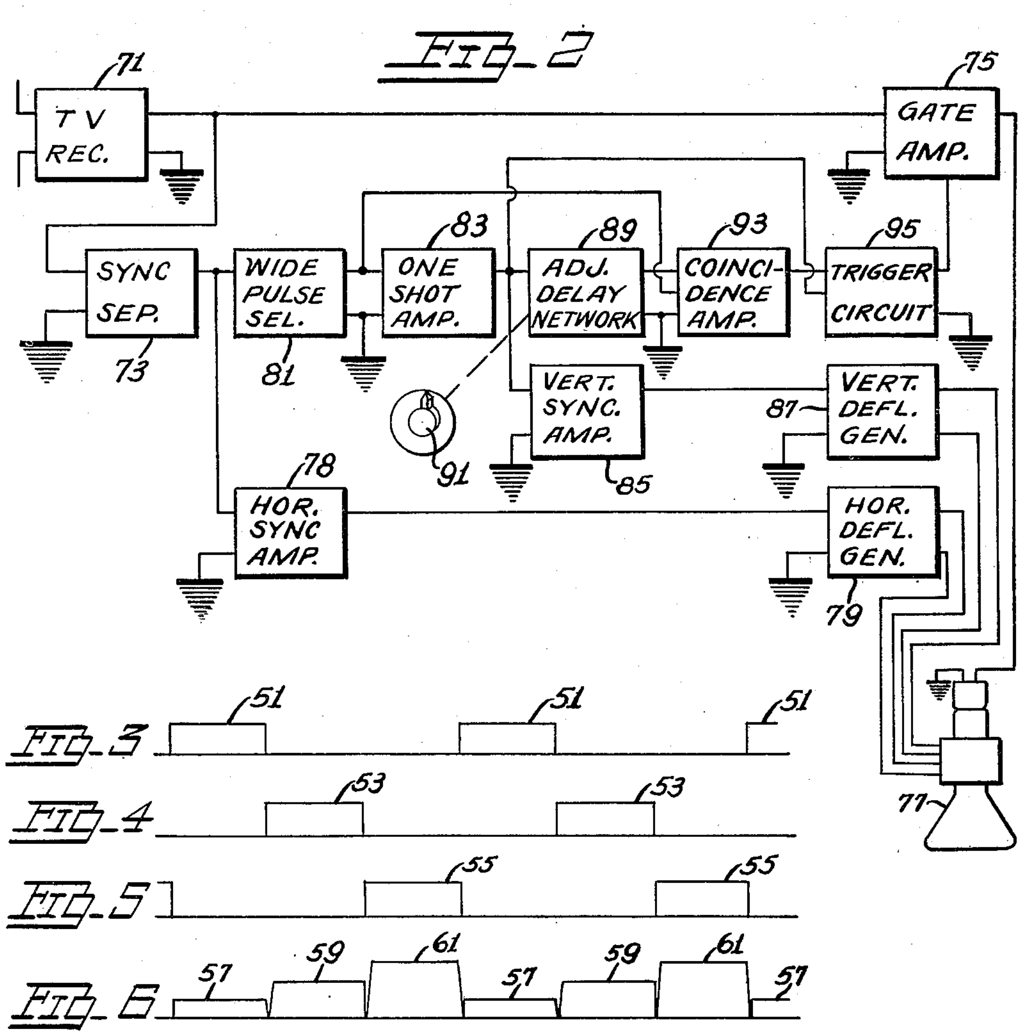
Figure 7:
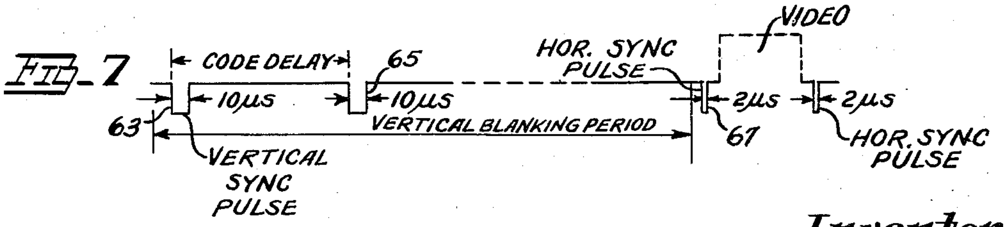

The invention will be described with reference to the accompanying drawings, wherein:

Figure 1 is a schematic block diagram of a television transmitter station embodying the invention, Figure 2 is a schematic block diagram of a receiver station for use with the transmitter equipment of Figure 1, Figures 3, 4 and 5 are oscillograms showing typical camera enabling waves or pulses produced in the operation of the system of Figure 1, Figure 6 is an oscillogram showing waves appearing in the system of Figure 1 in the production of frame or field code pulses, and Figure 7 is an oscillogram showing a portion of a typical television signal produced in the operation of the systems of Figures 1 and 2.

Referring to Figure 1, a plurality of television cameras 1, 3 and 5 are directed at respective scenes such as PPI displays (not shown) depicting different altitude layers as described above. Each of the cameras is connected to busses 7 and 9 carrying respectively vertical and horizontal synchronizing signals from a sync generator 11, and the video signal output circuits of all the cameras are connected in aparallel to a mixer 12.

A plurality of trigger circuits 15, 17, and 19, one for each camera, are connected in a closed ring so that cessation of output from one trigger circuit will initiate output from the next trigger circuit in the ring. The trigger circuits may be multivibrators, gas-filled discharge tubes, or other known devices having two states of stability and the characteristic of being thrown or triggered from one state to the other by a control pulse. Trigger pulses are supplied to all of the circuits 15, 17, and 19 from the vertical synchronizing bus 7, and outputs from the trigger circuits are applied to the cameras 1, 3 and 5 respectively. The cameras are normally biased to provide no video output. The trigger circuit outputs overcome this bias and "enable" the cameras.

The trigger circuit outputs are also applied to respective voltage dividers 21, 23 and 25, each including an adjustable tap which is connected to the plate of a respective one of a plurality of diodes 27, 29 and 31. The cathodes of the diodes are connected together to a resistor 33.

A variable pulse delay circuit 37 is connected to the vertical sync bus 7, and to the resistor 33. The circuit 37 is preferably of the type known as a phantastron, but may be any other circuit, such as a multivibrator, which provides an output pulse delayed with respect to an input pulse by an amount depending upon a control voltage applied to the circuit.

The output of the pulse delay circuit 37 is applied to a gate amplifier 43. The amplifier 43 is normally biased to cutoff, but operates, following the application to it of a control pulse from the delay circuit 37, for a period slightly less than the interval between two horizontal sync pulses. The horizontal sync pulse passed by the gate amplifier 43 is applied to a mixer 13.

Another gate amplifier 45 is connected to the horizontal sync bus 9 and is controlled by the vertical sync signal on the bus 7. The leading edge of each vertical sync pulse turns on the amplifier 45 long enough to pass only one horizontal sync pulse, which goes to the mixer 13. The output of the mixer 13 is applied to a pulse widener circuit 47, which is a "one shot" multivibrator or similar known device for providing a single wide output pulse in response to each input pulse. The wide output pulses from the circuit 47 are combined in the mixer 12 with the signals from the television cameras 1, 3 and 5, and applied therewith to a television transmitter 49. Preferably, but not necessarily, the connections to the mixer 12 are such that the pulses from the pulse widener 47 are opposite in polarity to the signals from the television cameras.

The operation of the system of Figure 1 is as follows:

The sync generator 11 continuously produces vertical sync pulses on the conductor 7 and horizontal sync pulses on the conductor 9. For purpose of explanation, assume that the television system is designed for a 360 line picture, 45 fields per second. To simplify explanation, it is assumed that there is no interlacing, so that the field frequency, 45 per second, is also the frame frequency. The repetition frequency of the vertical sync pulses is 45 per second, and the repetition frequency of the horizontal or line sync pulses is $360 \times 45 = 16{,}200$ per second. The vertical sync pulses may be 10 microseconds wide, and the horizontal sync pulses may be 2 microseconds wide.

The trigger circuits 15, 17 and 19 are tripped in sequence by the vertical sync pulses, each trigger circuit remaining "on" until the next pulse transfers conduction to the following trigger circuit in the ring. Figure 3 shows the output of the trigger circuit 15, which comprises a substantially rectangular voltage wave 51 having a duration of $\frac{1}{45}$ second, repeating at intervals of $\frac{1}{15}$ second. The wave 51 is applied to the camera 1, turning it on during every third frame period.

The outputs of the trigger circuits 17 and 19 are shown in Figures 4 and 5 respectively, and comprise voltage waves 53 and 55 similar to the wave 51 but occurring during different frame periods. The waves 53 and 55 enable the cameras 3 and 5 respectively. Thus the camera 1 operates for one frame period, the camera 3 operates during the next frame period, the camera 5 operates during the following frame period, and the cycle repeats. The outputs of the cameras 1, 3 and 5 include, during each period of operation, 360 line signals, each comprising a horizontal sync pulse followed by a video signal representing one line of the picture. The camera output modulates the transmitter 49 and is broadcast.

The camera enabling pulses 51, 53 and 55 are applied to the voltage dividers 21, 23 and 25 respectively, which are adjusted to provide different attenuations. For example, voltage divider 21 may provide an output of one-fourth the amplitude of the wave 51, the voltage divider 23 may provide one-half the amplitude of the wave 53, and the voltage divider 25 may provide three-fourths the amplitude of the wave 55. The diodes 27, 29, and 31 allow conduction from the voltage dividers to the resistor 33, but prevent the flow of current from the tap of any voltage divider to those of the other voltage dividers. The resultant voltage drop across the resistor 33 is shown in Figure 6, and comprises a sequence of substantially rectangular voltage waves 57, 59 and 61, whose respective amplitudes correspond to the adjustments of the voltage dividers 21, 23 and 25. The voltages 57, 59 and 61 appear during the operation of the cameras 1, 3 and 5 respectively.

Vertical sync pulses are applied to the pulse delay circuit 37 which produces output pulses delayed from the leading edges of the vertical sync pulses by an interval determined by the voltage across the resistor 33. This delayed pulse is applied to open the gate amplifier 43. As the delayed pulse has a duration slightly less than interval between two horizontal sync pulses the gate amplifier 43 is turned on long enough to allow only one horizontal sync pulse to pass to the mixer 13.

The gate amplifier 45 is turned on by the front edge of each vertical sync pulse, long enough to allow only one horizontal sync pulse to pass to the mixer 13. The output of the mixer 13 thus comprises, at the beginning of each frame, a two microsecond pulse coincident with the leading edge of the vertical sync pulse, and a second two microsecond pulse following the first by an interval which depends on which one of the cameras 1, 3 and 5 is in operation. Since the second pulse coincides with a horizontal sync pulse, the interval is an integral multiple of the horizontal sync repetition period.

The pulse widener 47 converts the two microsecond pulses from the mixer 13 to ten microsecond pulses having the same spacing between their leading edges as the two microsecond pulses. The widened pulses are combined with the camera outputs in the mixer 12. Figure 7 shows a portion of the composite signal transmitted from the ground station, starting with the vertical retrace, or blanking, period. The vertical sync pulse 63 is followed by a code pulse 65, both of said pulses being derived from the mixer 13 as described. The code delay between the pulse 63 and the pulse 65 is an integral number of horizontal sync pulse periods, the number depending on which camera is in operation. The picture signals begin at the end of the vertical blanking period, starting with a horizontal sync pulse 67 followed by the video signal representing the first line of the picture. The remaining line signals are not shown in Figure 7.

Figure 2 shows a receiver system suitable for use with the signals transmitted by the system of Figure 1. In the aircraft navigation system described above, apparatus like that of Figure 2 is carried on each aircraft involved. A receiver 71, designed to respond to the ground station transmitter 49, is connected to a sync separator 73 and is coupled through a gate amplifier 75 to the beam intensity control electrode of a cathode ray oscilloscope tube 77. The sync separator circuit is like that used in standard television practice, and passes the negative going pulses (such as the vertical and horizontal sync pulses), rejecting the positive going video signals.

The output of the sync separator goes to a horizontal sync amplifier 78, which responds only to the narrow (two microsecond) pulses, and controls a horizontal deflection voltage generator 79. A wide pulse selector circuit 81 is also connected to the sync separator 73. The wide pulse selector may be a pulse width discriminator of the type described in copending U. S. Patent application Serial Number 782,829, filed October 29, 1927, by Everett Eberhard and entitled Pulse Width Discriminator, or any other known means for passing ten microsecond pulses and rejecting two microsecond pulses, such for example, as shown in U. S. Patent 2,418,127 granted on April 1, 1947, to Emile Labin.

The wide pulse selector 81 is connected to a so-called "one-shot" amplifier 83. This is an amplifier designed to pass a ten microsecond pulse, but in so doing to bias itself to cutoff, remaining in cutoff condition for a considerable period, after which it will pass an applied pulse. The output of the amplifier 83 goes to a vertical sync amplifier 85, which controls a vertical deflection voltage generator for the cathode ray tube 77.

The amplifier 83 is also connected to delay network 89, whose delay may be adjusted as by means of a manual control knob 91. The outputs of the delay network 89 and the wide pulse selector 81 are applied to a coincidence amplifier 93, which provides output only in response to simultaneous occurence of output from the network 89 and the selector 81.

A trigger circuit 95, preferably of the Eccles-Jordan or "flip flop" type, is connected to the coincidence amplifier 93 and to the "one shot" amplifier 83. Output from the trigger circuit 95 turns on the gate amplifier 75 in response to each pulse from the coincidence amplifier 93, and turns off the amplifier 75 in response to each pulse from the "one shot" amplifier 83.

In the operation of the system of Figure 2, the sync separator 73 passes the vertical sync pulses, the frame code pulse, and the horizontal sync pulses. The latter control the horizontal deflection system for the tube 77. The wide pulse selector passes only the ten microsecond vertical sync pulses and frame code pulses. Both of these pulses go to the coincidence amplifier 93, but only the vertical sync pulse gets through the "one shot" amplifier 83, which remains cut off at least until the end of the vertical blanking period. The vertical sync pulse controls the vertical deflection system of the tube 77, and also goes through the delay circuit 89 to the coincidence amplifier 93.

The delay network 89 is adjusted to introduce a delay substantially equal to the code delay corresponding to the particular camera at the transmitter station whose view is to be displayed at the receiver. When the selected camera is in operation, the delayed vertical sync pulse will coincide with or overlap with the code pulse from the wide pulse selector 81. The coincidence amplifier 93 will provide an output pulse, throwing the trigger circuit 95 to open the gate amplifier 75 and allow the video signal to modulate the beam of the tube 77. The trigger circuit and gate amplifier remain in this condition throughout the remainder of the current frame; at the beginning of the next frame the vertical sync pulse from the "one shot" amplifier 83 throws the trigger circuit 95 over to cut off the gate amplifier.

During ensuing frames the delayed vertical sync pulse will not coincide with or overlap the code pulse, so the coincidence amplifier 93 provides no output and the trigger circuit is not actuated. Since the trigger circuit is already in its "off" condition, the following vertical sync pulse has no effect. Thus the beam of the cathode ray tube 77 remains off until the next frame from the selected camera occurs, when the gate 75 is opened again.

Although a specific embodiment of the invention has been described involving time division multiplexing of the signals from three television cameras, it will be apparent that a greater number of signals may be multiplexed in the same manner, up to the limit imposed by the length of the vertical blanking period. Moreover, the time sharing between cameras need not necessarily be done equally as described; for example, some of the cameras may be enabled every Nth frame, others every Mth frame, etc., where, as in certain circumstances, it is desirable to have a higher repetition rate for some of the pictures than for others.

I claim as my invention:

1. A multiplex television system including a plurality of television cameras, common synchronizing signal generator means for all of said cameras, and means normally biasing all of said cameras to provide no output; means responsive to said synchronizing signal generator to overcome the bias on said cameras, one at a time and in succession for periods beginning with one vertical synchronizing pulse and ending with the next following vertical synchronizing pulse, whereby each camera provides video output during one field; means providing a control voltage whose magnitude depends upon which of said cameras is in operation, and means responsive to said control voltage and to horizontal synchronizing pulses from said synchronizing signal generator to produce a code pulse following each of said vertical synchronizing pulses at a respective interval corresponding to the magnitude of said control voltage.

2. A multiplex television system including a plurality of sources of video signals, synchronizing signal generator means, and means normally biasing all of said sources to provide no output; a ring oscillator controlled by said synchronizing signal generator to overcome the bias on said sources, one at a time and in succession for periods beginning with one vertical synchronizing pulse and ending with the next following vertical synchronizing pulse, whereby each source provides video output during one field; means providing a control voltage whose magnitude depends upon which of said sources is in operation, variable delay means responsive to said control voltage and connected to said synchronizing signal generator to produce a pulse following each of said vertical synchronizing pulses at a respective interval corresponding to the magnitude of said control voltage, a mixer, and means for applying said last delayed pulses and said video signals to said mixer.

3. In a multiplex television system including a plurality of sources of video signals, synchronizing signal generator means, and means normally biasing all of said sources to provide no output; means responsive to said synchronizing signal generator to overcome the bias on said sources, one at a time and in succession for periods beginning with one vertical synchronizing pulse and ending with the next following vertical synchronizing pulse, whereby each source provides video output during one field; the improvement comprising means providing a control voltage whose magnitude depends upon which of said sources is in operation, and means responsive to said control voltage and to horizontal synchronizing pulses from said synchronizing signal generator to produce a code pulse following each of said vertical synchronizing pulses at a respective interval corresponding to the magnitude of said control voltage; also in said system a transmitter, and means applying said synchronizing pulses, said code pulses and said video signals to said transmitter; at least one receiver, a kinescope, and means controlling said kinescope in response to vertical and horizontal synchronizing pulses from said receiver, means including a gate amplifier for applying video signals to said kinescope, and the further improvement comprising means including an adjustable pulse delay circuit for opening said gate amplifier only when said code pulse follows the preceding vertical synchronizing pulse by a predetermined interval.

4. In a multiplex television system including a plurality of sources of video signals, synchronizing signal generator means, and means normally biasing all of said sources to provide no output; means responsive to said synchronizing signal generator to overcome the bias on said sources, one at a time and in succession for periods beginning with one vertical synchronizing pulse and ending with the next following vertical synchronizing pulse, whereby each source provides video output during one field; the improvement comprising means providing a control voltage whose magnitude depends upon which of said sources is in operation, and variable delay means responsive to said control voltage and connected to said synchronizing signal generator to produce a code pulse following each of said vertical synchronizing pulses at a respective interval corresponding to the magnitude of said control voltage, said interval being an integral number of line periods; also in said system a transmitter, and means applying said synchronizing pulses, said code pulses and said video signals to said transmitter; at least one receiver, a cathode ray oscilloscope tube, and means deflecting the cathode ray of said tube in response to vertical and horizontal synchronizing pulses from said receiver, and the further improvement comprising means including a gate amplifier for applying video signals to said tube, and means including an adjustable pulse delay circuit for opening said gate amplifier only when said code pulse follows the preceding vertical synchronizing pulse by substantially a predetermined interval.

HAROLD J. SCHRADER.

REFERENCES CITED

The following references are of record in the file of this patent:

UNITED STATES PATENTS

| Number | Name | Date |
|---|---|---|
| 2,219,149 | Goldsmith | Oct. 22, 1940 |
| 2,253,292 | Goldsmith | Aug. 19, 1941 |
| 2,294,820 | Wilson | Sept. 1, 1942 |
| 2,295,023 | Beatty | Sept. 8, 1942 |
| 2,298,476 | Goldsmith | Oct. 13, 1942 |
| 2,301,254 | Carnahan | Nov. 10, 1942 |
| 2,337,980 | Du Mont | Dec. 28, 1943 |
| 2,378,746 | Beers | June 19, 1945 |
| 2,405,252 | Goldsmith | Aug. 6, 1946 |
| 2,431,115 | Goldsmith | Nov. 18, 1947 |
| 2,465,371 | Grieg | Mar. 29, 1949 |
| 2,481,410 | Goldsmith | Sept. 6, 1949 |

FOREIGN PATENTS

| Number | Country | Date |
|---|---|---|
| 508,037 | Great Britain | June 26, 1939 |
| 514,021 | Great Britain | Oct. 27, 1939 |